Nov. 23, 1926.
C. H. HOYT
1,607,627
STARTING AND STOPPING MECHANISM
Original Filed July 23, 1921
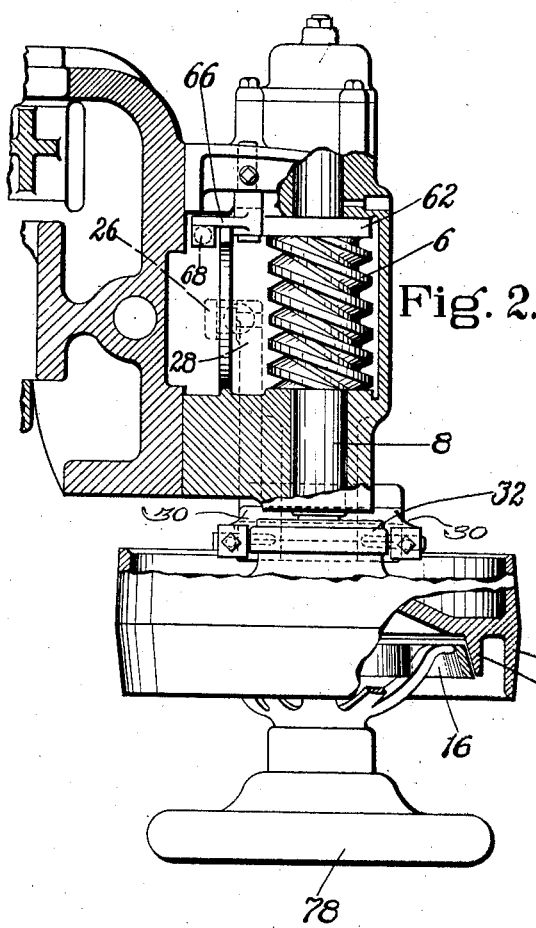
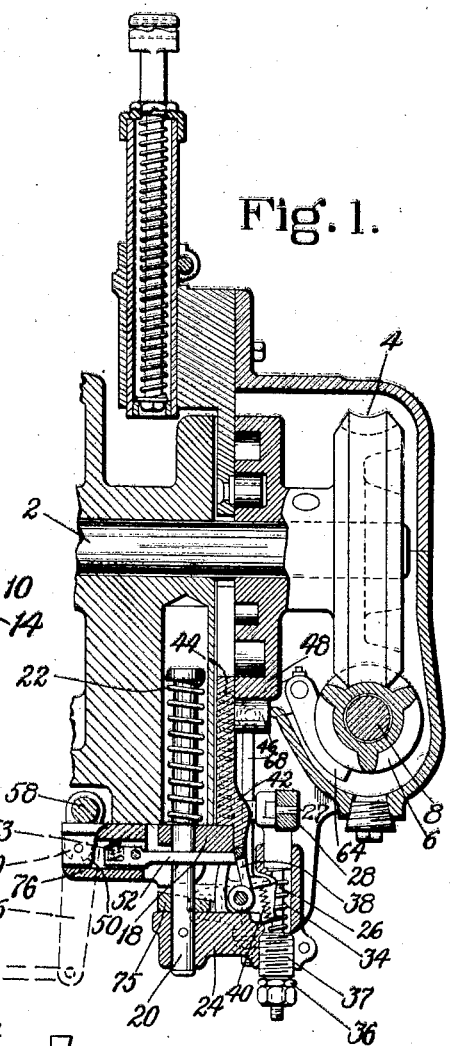
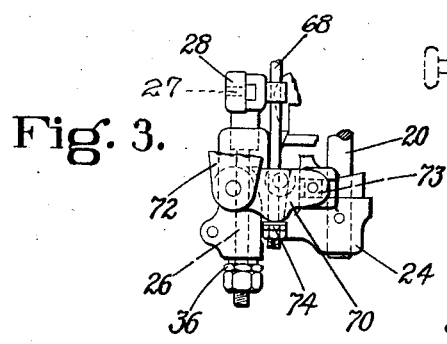
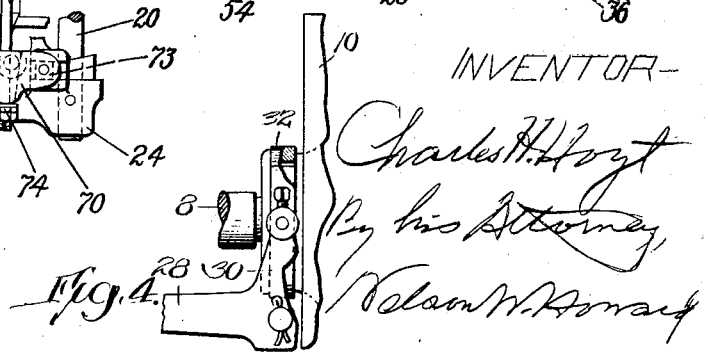
INVENTOR—
Charles H. Hoyt
By his Attorney, Patented Nov. 23, 1926.

1,607,627

UNITED STATES PATENT OFFICE.

CHARLES H. HOYT, OF BEVERLY, MASSACHUSETTS, ASSIGNOR TO UNITED SHOE MACHINERY CORPORATION, OF PATERSON, NEW JERSEY, A CORPORATION OF NEW JERSEY.

STARTING AND STOPPING MECHANISM.

Original application filed July 23, 1921, Serial No. 487,098. Divided and this application filed November 17, 1922. Serial No. 601,595.

This invention relates to starting and stopping mechanisms, and is herein illustrated in an embodiment designed for use in a machine for lasting the heel ends of shoes described and claimed in my copending application Ser. No. 487,098, filed on July 23, 1921, of which this application is a division, and upon which Letters Patent No. 1,583,044 were granted on May 4, 1926. It will be recognized, however, that the invention is not limited to use in machines of that particular type but is of general applicability to various kinds of machines.

The invention aims to provide a simple and compact construction and arrangement of starting and stopping mechanism of that type in which the stopping of the driven part or parts is automatically effected at a predetermined time. The construction herein shown comprises a driving shaft and a driven shaft arranged in angular relation to each other and geared together, with a clutch and a brake on the driving shaft which are controlled from the driven shaft through connections designed to insure that the parts driven from the clutch will be automatically stopped at the time required.

The novel features of the invention, including various details of construction and combinations of parts, will now be more particularly set forth by reference to the accompanying drawings and pointed out in the claims.

In the drawings—

Fig. 1 is a view in vertical section showing starting and stopping mechanism embodying the present invention as applied to a machine of the type illustrated in the above-mentioned Letters Patent.

Fig. 2 is a plan view of the mechanism shown in Fig. 1, with parts in section, and other parts omitted for clearness of illustration, Fig. 3 is a side elevation of a portion of the mechanism as viewed from the opposite side with reference to Fig. 1, and Fig. 4 is a view in end elevation of a portion of the clutch controlling means.

For imparting movement to the operating instrumentalities of the machine a driven shaft 2 is provided, having on its outer end a spiral gear 4 driven by a worm 6 on a shaft 8, herein termed the driving shaft, which in the construction shown is arranged at right angles to the shaft 2. Mounted to turn on the shaft 8 is a driving pulley 10 which may be operated from any suitable source of power. This pulley is provided with a clutch ring 14 arranged to engage a cooperating clutch member 16 which is fast on the shaft 8. For controlling the clutch there is slidingly mounted in a fixed plate 18 a rod 20 which is forced upwardly by a spring 22 and has fast on its lower end a block 24. Slidably mounted in the block 24 is a rod 26 the upper end of which has an enlarged head thereon provided with a horizontal slot to receive the head of a pin 27 which is mounted on an arm 28 extending lengthwise of the shaft 8 from the lower end of a pivoted yoke member 30 (Figs. 2 and 4) the opposite arms of which are connected to a thrust ring 32 engaging the pulley 10, the arm 28 and the member 30 thus comprising a bell-crank lever. A spring 34 bears upwardly on the enlarged head portion of the rod 26, as shown in Fig. 1, and thus affords a yielding connection between the rod and the block 24 when the block receives its upward movement, the normal vertical position of the rod in the block being determined adjustably by a nut 36 on the lower end of the rod, this nut engaging a threaded member 37 upon which the lower end of the spring 34 is seated.

Pivoted on the block 24 is a trip member or pawl 38 normally held by a spring 40 with its laterally projecting upper end under the lower end of a slide 42 which is pressed upwardly by springs 44 (only one of which is shown) abutting against the plate 18 and which carries a roll 46 in engagement with a peripheral cam 48 on the driven shaft 2. When the parts are positioned as illustrated in Fig. 1 the cam 48 through the slide 42 and the pawl 38, holds the block 24 in its lowermost position with the lever arm 28 depressed and the yoke 30 thus turned into position to release the pulley 10 from clutch setting pressure, thus permitting the pulley to turn idly on the shaft. For starting the machine there is provided a slide 50 having pivoted thereon a finger 52 which is normally pressed upward by a spring 53, the outer end of this finger being arranged to engage the laterally projecting end of the pawl 38. For operating the slide 50 there is provided a manually controlled push rod 54 connected to a lever arm 56 on a rock shaft 58 which carries a forked arm 60 engaging a pin on the slide 50. It will thus be evident that upon rearward movement of the push rod 54 the parts 50 and 52 are operated to push the pawl 38 from beneath the slide 42, thereby releasing the block 24 to the operation of the spring 22 which forces the block and the pawl 38 upwardly and through the spring 34 acts yieldingly on the lever arm 28 to swing the yoke 30 outwardly and force the pulley into position for its ring 14 to engage the clutch member 16. The shaft 2 is thus started in operation, and in the movement of this shaft the cam 48 is turned into position to cause the springs 44 to force the slide 42 upwardly until the pawl 38 is again swung by its spring 40 beneath the lower end of the slide. If the operator has at this time not released the push rod 54, the finger 52 nevertheless is ineffective to prevent the return of the pawl 38 into position under the slide 42, since the laterally projecting end of the pawl is above the finger. At a predetermined time in the revolution of the shaft 2, depending upon the shape of the cam 48, the cam depresses the slide 42 and the latter through the pawl 38 acts to force the block 24 downwardly to withdraw the yoke member 30 from clutch setting position, thus disconnecting the shaft 8 from the source of power. In this downward movement of the pawl 38 the finger 52 yields against the resistance of the spring 53 if the operator still continues the pressure on the rod 54.

Mounted also on the shaft 8 is a brake drum 62 cooperating with which is a pivoted brake shoe 64. An arm 66 which is fast with the brake shoe 64 is connected to a vertical rod 68 (Fig. 3) which extends downward loosely through a lever 70 pivoted at one end to a lug 72 on the frame of the machine and connected at its other end to the block 24 by means of a block 73 which is pivoted on the lever 70 and has a sliding connection with a part fast on the block 24, the rod 68 having on its lower end a nut 74 arranged to be engaged by the lever 70. Through these connections the block 24 in its downward clutch releasing movement operates the rod 68 to apply the brake positively with a force determined by the adjustment of the nut 74, and when the block 24 is tripped as above described to set the clutch the brake is simultaneously released by the upward movement of the lever 70. The lever connections thus provided affords quick and effective means for applying the brake in time relation to the release of the clutch to stop the machine at the end of each cycle, or at the end of each period of the cycle.

As a safety device which may be utilized if desired to render the starting means ineffective to start the machine in case of accidental operation of the push rod 54, or to permit the clutch to be released without applying the brake in case the machine should stop by reason of encountering undue resistance before the shaft 2 arrives at a normal stopping position, a manually operative wedge block 75 is mounted to turn about the rod 20 on the block 24, this wedge block being arranged to operate substantially as described in Letters Patent No. 1,193,576, granted on Aug. 8, 1916, upon an application of R. F. McFeely. It will be understood that the wedge block 75, in the normal operation of the starting and stopping means, is permitted to enter a recess positioned above it in a fixed member 76 in which the slide 50 is mounted. When the wedge block, however, is turned from its normal position it acts as a stop by engagement with the member 76, in case the pawl 38 is operated by the push rod, to limit upward movement of the block 24 at such a point as to prevent the clutch from becoming operative, but after the brake has been released by such limited upward movement of the block 24. Insurance is thus afforded that the machine will not be started accidentally, and opportunity is also afforded when the clutch and the brake are thus rendered inactive to turn the shaft and its connected parts manually in case it should be desired to do so, the shaft 8 having for this purpose a hand wheel 78 on its outer end. If the resistance encountered in the operation of the machine should cause the shaft 2 to come to a stop before it arrives at a normal stopping position, the wedge block 75 may be turned and by the engagement of its upper wedge face with the member 76 it will then act to depress the block 24 enough to release the clutch without applying the brake. By manipulation of the hand wheel 78 the shafts may then be turned manually in either direction and the machine may be freed from the obstruction encountered, after which the block 75 may be turned back to its normal position.

Having described the invention, what I claim as new and desire to secure by Letters Patent of the United States is:

1. In starting and stopping mechanism, the combination with a driven shaft and a driving shaft extending transversely of said driven shaft, of a clutch and a brake on said driving shaft, a clutch controlling member, yielding connections between said member and the clutch for controlling the clutch, manually controlled means for moving said member in a direction to set the clutch, means on said driven shaft for moving said member reversely to release the clutch, and additional connections between said member and the brake for controlling the brake in time relation to the clutch.

2. In starting and stopping mechanism, the combination with a driven shaft and a driving shaft extending transversely of said driven shaft, of a clutch and a brake on said driving shaft, a clutch controlling member connected to said clutch, manually controlled means for moving said member in a direction to set the clutch, means on said driven shaft for moving said member reversely to release the clutch, a lever connected to said controlling member to be operated by the movements of said member, and connections between said lever and the brake for controlling the brake in time relation to the clutch.

3. In starting and stopping mechanism, the combination with a driven shaft and a driving shaft extending transversely of said driven shaft, of a clutch and a brake on said driving shaft, a clutch controlling member connected to said clutch, manually controlled means for moving said member in a direction to set the clutch, means on said driven shaft for moving said member reversely to release the clutch, a brake operating lever, a substantially stationary fulcrum for one end of said lever, a connection between the other end of said lever and said clutch controlling member for operating the lever by the movements of said member, and means engaged by the lever between the opposite ends of the lever for operating the brake.

4. In starting and stopping mechanism, the combination with a driven shaft and a driving shaft extending transversely of said driven shaft, of a clutch and a brake on said driving shaft, a clutch controlling member connected to said clutch, manually controlled means for moving said member in a direction to set the clutch, means on said driven shaft for moving said member reversely to release the clutch, a lever connected to said clutch controlling member to be operated by said member, and a rod connected to the brake and extending loosely through said lever, said rod having thereon means arranged to be engaged by the lever in its movement in one direction to apply the brake.

5. In starting and stopping mechanism, the combination with a driven shaft and a driving shaft extending transversely of said driven shaft, of a clutch on said driving shaft, a clutch controlling member, manually controlled means for moving said member in a direction to set the clutch, means on said driven shaft for moving said member reversely to release the clutch, a bell-crank connected to the clutch, and a yielding connection between one arm of said bell-crank and said clutch controlling member for controlling the clutch.

6. In starting and stopping mechanism, a driven shaft, a driving shaft extending at substantially right angles to said driven shaft, gearing connecting said shafts, a clutch and a brake on said driving shaft, a controller block for said clutch and brake, spring means arranged to be tripped to move said block in a direction to set the clutch and release the brake, means on said driven shaft for moving said block reversely to release the clutch and apply the brake, a bell-crank having one arm connected to the clutch and the other arm connected to said block, and a lever arranged to be operated by said block and connected to the brake.

7. In starting and stopping mechanism, the combination with a driving shaft and a driven shaft, of a clutch and a brake on said driving shaft, controlling mechanism for both the clutch and the brake movable in one direction to set the clutch and release the brake and in the opposite direction to release the clutch and apply the brake, means on said driven shaft for moving said controlling mechanism in said last-named direction, means enabling the operator to set said controlling mechanism in an intermediate position in which the clutch is inoperative and the brake released, said means comprising a stop for limiting movement of the controlling mechanism in the direction to set the clutch, and manual means for turning said shaft when the controlling mechanism is thus positioned.

8. In starting and stopping mechanism, a driving shaft and a driven shaft extending in transverse relation to each other and operatively connected together, a clutch and a brake on said driving shaft, controlling mechanism arranged to be manually controlled to set the clutch and release the brake, means on said driven shaft for moving said controlling mechanism reversely to release the clutch and apply the brake, a device enabling the operator to set said controlling mechanism in an intermediate position in which the clutch is inoperative and the brake released, and means on said driving shaft for turning said shafts manually when the controlling mechanism is thus positioned.

In testimony whereof I have signed my name to this specification.

CHARLES H. HOYT.

Certificate of Correction.

Patent No. 1,607,627.                                Granted November 23, 1926, to

CHARLES H. HOYT.

It is hereby certified that error appears in the printed specification of the above-numbered patent requiring correction as follows: Page 3, line 99, claim 7, for the word "shaft" read *shafts;* and that the said Letters Patent should be read with this correction therein that the same may conform to the record of the case in the Patent Office.

Signed and sealed this 23d day of August, A. D. 1927.

[SEAL.]
                                       M. J. MOORE,
*Acting Commissioner of Patents.*